United States Patent [19]

Macachor

[11] Patent Number: 5,452,432
[45] Date of Patent: Sep. 19, 1995

[54] PARTIALLY RESETTABLE, SEGMENTED DMA COUNTER

[75] Inventor: Edgar R. Macachor, Santa Clara, Calif.

[73] Assignee: Chips and Technologies, Inc., San Jose, Calif.

[21] Appl. No.: 97,301

[22] Filed: Jul. 23, 1993

Related U.S. Application Data

[63] Continuation of Ser. No. 567,501, Aug. 14, 1990, abandoned.

[51] Int. Cl.⁶ .............................................. G06F 13/00
[52] U.S. Cl. .................................... 395/425; 364/240; 364/242.34; 364/260.1; 364/DIG. 1
[58] Field of Search ................ 395/800, 425, 275, 250, 395/200

[56] References Cited

U.S. PATENT DOCUMENTS

| | | | |
|---|---|---|---|
| 3,585,606 | 6/1971 | Evans et al. | 395/425 |
| 4,797,809 | 1/1989 | Sato et al. | 395/425 |
| 4,831,523 | 5/1989 | Lewis et al. | 395/275 |
| 4,843,544 | 6/1989 | Dulac et al. | 395/250 |
| 4,905,184 | 2/1990 | Giridhar et al. | 395/400 |
| 4,924,427 | 5/1990 | Savage et al. | 395/425 |
| 4,942,515 | 7/1990 | Marzucco et al. | 395/275 |
| 4,985,914 | 1/1991 | Fukunaga | 379/88 |
| 5,111,425 | 5/1992 | Takeuchi et al. | 395/425 |
| 5,111,463 | 5/1992 | Zook | 371/39.1 |
| 5,179,709 | 1/1993 | Bailey et al. | 395/725 |
| 5,287,471 | 2/1994 | Katayose et al. | 395/425 |

OTHER PUBLICATIONS

Leffler et al., *The Design and Implementation of the 4.3BSD UNIX Operating System*, Chapter 7, pp. 187–211 (1989).

"82380 High Performance 32-bit DMA Controller with Integrated System Support Peripherals", Intel Advance Information, Oct. 1988.

"Am9517A/8237A Multimode DMA Controller," AMD Product Information, Oct. 1988.

Kraft et al., *Mini/Microcomputer Hardware Design*, Chapter 9, (1979).

Wakerly, *Microcomputer Architecture and Programming*, Chapter 11 (1989).

*Primary Examiner*—Alyssa H. Bowler
*Assistant Examiner*—Alpesh M. Shah
*Attorney, Agent, or Firm*—Townsend and Townsend Khourie and Crew

[57] ABSTRACT

A direct memory access (DMA) controller (4) utilizes a segmented counter (220). A first, byte counter portion (330) of the counter is initialized with a preselected value and decremented for each byte transfer. After the byte portion of the counter reaches the preselected value it decrements a second, block portion (332) of the counter which is initialized based upon the amount of data to be transferred. When both the byte counter and the block counter reach zero the data transfer is completed.

10 Claims, 2 Drawing Sheets

PARTIALLY RESETTABLE, SEGMENTED DMA COUNTER

This is a Continuation of application Ser. No. 07/567,501, filed Aug. 14, 1990, now abandoned.

BACKGROUND OF THE INVENTION

The present invention relates to the field of semiconductor devices, computer systems, their manufacture, and operation. More specifically, in one embodiment the invention provides an improved technique for direct memory access (DMA) transfers in a computer system, as well as an apparatus for performing DMA transfers.

In computer systems, data are transferred over one or more buses in the system. In some computer systems, data transfers always are made via a central microprocessor or central processing unit (CPU). In such computer systems a transfer of data from, for example, a disk drive to memory requires intervention of the central processing unit. This frequently causes the overall operation of the computer system to slow substantially because the CPU spends substantial amounts of time involved in such data transfers between peripheral devices rather than conducting the core operations of the computer system.

In order to overcome this difficulty, a variety of solutions have been proposed. One such solution is the use of a direct memory access (DMA) controller. FIG. 1 is an overall block diagram illustrating a computer system 2 which utilizes a DMA controller 4. The system includes well known buses such as a data bus 6, address bus 8, and control bus 10. Central operations in the system are conducted on a microprocessor 12 and utilize data in memory 14. Output from the system is made via one or more output ports, host adapters, or other devices 16 and input to the system is made via one or more input devices 18.

The DMA controller is a specialized purpose processor which moves data according to a desired program. The DMA controller enables the transfer of data from or to, for example, an input port such as a disk drive to memory without the use of the microprocessor. DMA controllers result in faster transfer of large blocks of data within the system and are commonly used as, for example, disk interfaces, local network interfaces, video interfaces, and the like. Often several DMA devices will be included in a system wherein a single DMA chip will service a single peripheral device or group of devices. DMA devices and their operation are described in, for example, Kraft et al., *Mini/Microcomputer Hardware Design*, Chapter 9 (1979) and Wakerly, *Microcomputer Architecture and Programming*, Chapter 11 (1989), which are incorporated herein by reference for all purposes.

In a conventional DMA transfer (using a SCSI port as an example of DMA applications) a DMA controller is intialized by setting a memory address, SCSI port address, and block length registers. The DMA controller then waits for the SCSI controller to indicate it is ready for data. The DMA controller then blocks access of the CPU to the bus, reads a block of data directly from memory, and writes it to the SCSI controller. The DMA controller then allows the CPU to continue operating until the SCSI controller is ready for another block of data. Such operations result in substantial speed increases particularly when used in conjunction with specialized software. DMA controllers currently include the Intel 82380 and AMD Am9517A/8237A devices.

While meeting with substantial success, prior DMA controllers have also met with certain limitations. For example, many prior DMA controllers utilize a word count register and increment the register by 1 each time a data transfer takes place. When the last word has been transferred a carry is generated which indicates that the transfer operation has been completed. Other systems store the final address of a buffer in an end address register. After each data transfer, a current address register is compared to the final address. If the values are equal the transfer is complete; if the values are not equal the current address register is incremented and processing continues. With either of the above systems, the DMA controller operates somewhat inefficiently when data are, for example, contained in non-contiguous blocks on a hard disk or disk drive. This occurs because the counters must be reset each time a new sector or data block is accessed on, for example, a hard disk. This is of particular concern when, for example, a disk is disconnected in the middle of a read operation. The data being read are contained on separate tracks, the counter in prior DMA systems must be reset entirely, and the disk drive must perform another seek operation and recover all of the data in question. Since seek operations are exceedingly slow, this can substantially slow system operation. Of course, disk drive applications are only exemplary of systems with this limitation. A wide variety of additional applications (such as networks) also suffer from this limitation.

From the above it is seen that an improved DMA controller and method of operation therefor are needed.

SUMMARY OF THE INVENTION

The present invention provides an improved DMA controller, as well as an improved method of operating a DMA controller. The invention recognizes that in many applications (such as data reads from a disk drive) data are frequently scattered over the hard disk. Consequently, the DMA controller is constantly resetting itself as the read head jumps around the disk, causing particular problems when a device such as a disk is disconnected in the middle of read or write operations. The invention herein capitalizes on the orthogonality of data observed in many areas of computer systems such as a track on a rigid disk drive used in a typical computer system. In such disk drives, the disk is composed of several sectors, and each sector is composed of several bytes of data of consistent length. Another area in which the invention relies on the orthogonality of data is in a bit-mapped visual display which is composed of vertical and horizontal elements of equal size. Other examples of data exhibiting this property is found in data communications networks in which data are transferred in multiple packets.

Accordingly, the DMA controller disclosed herein is provided with a byte counter and a block counter. For every byte transferred the byte counter is decremented by one, or otherwise accounts for the transfer of one byte of data. Each time the byte counter reaches zero or otherwise indicates the transfer of a preset number of data bytes, the byte counter issues a signal which decrements the block counter. When both the block counter and the byte counter reach zero, the data transfer is assumed to be complete.

Accordingly, in one embodiment the invention provides a direct memory access (DMA) controller for a computer system. The direct memory access controller includes DMA processing means adapted to place a series of data bytes from a selected input device on a data bus for use by a selected output device at selected times; and a counter for placing a desired number of said data bytes on said data bus, said counter means comprising a first, byte counter and a second, block counter, said byte counter adapted to count a number of bytes transferred and connected to said block counter to increment or decrement said block counter each time a first preselected number of data bytes have been transferred, said processing means stopping data transfers to said data bus when said block counter reaches a second preselected number of data blocks.

A further understanding of the nature and advantages of the inventions herein may be realized by reference to the remaining portions of the specification and the attached drawings.

DESCRIPTION OF THE PREFERRED EMBODIMENTS

Figure 2:
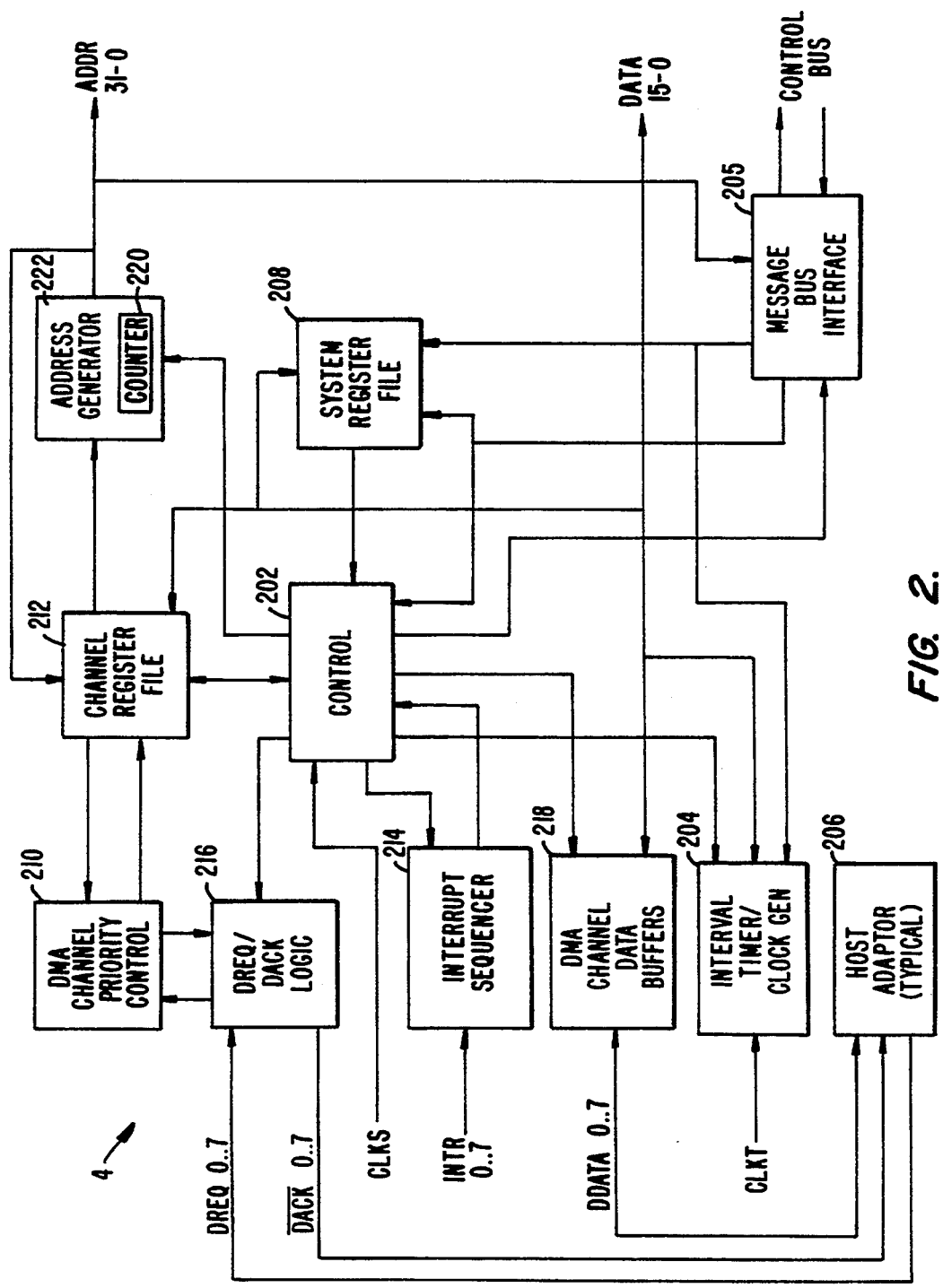
FIG. 2 is an overall block diagram of a DMA controller according to one embodiment of the invention.

FIG. 2 illustrates the DMA controller disclosed herein according to one embodiment of the invention. FIG. 2 illustrates the DMA controller 4 in greater detail. The DMA controller operates under the direction of a control system 202 and based upon clock signal CLKS, as well as control signals received by way of a message bus interface 205. The DMA controller supports up to 8 host adapters 206, which are normally serviced in parallel. A system register file 208 is a set of programmable registers which contain the operating software for the controller. A DMA channel priority control 210 establishes which of the host adapters currently has the highest priority. An interval timer/clock generator 204 is used to set various time stamping events in and for the DMA.

Channel register file 212 contains variable or user supplied parameters for each of the channels. Such parameters include, for example, burst length, starting address, block size, block count, stride length, and byte count. Block count and byte count will vary during incrementing of the counter described herein. Burst length limits the number of bytes which may be transferred for selected devices and, therefore, the length of time a slow device may stay on the bus. The stride variable is added to the current address when the byte count reaches zero for offset in, for example, video displays or for removal of header information stored in memory.

An interrupt sequencer 214 performs interrupt sequencing for the DMA controller according to means well known to those of skill in the art. In one embodiment the DMA controller supports up to 8 host adapters 206, normally serviced in parallel. Each host adapter requests for data transfers by asserting its assigned DREQ (data request) signal line which is connected to data request/data acknowledge logic 216. The DMA channel priority control logic 210 responds by asserting the corresponding DACK* (data acknowledge) signal line when the requesting host adapter has the current highest priority (line 0 generally being the highest priority and line 7 being the lowest). With the DREQ/DACK* signal validated, the DMA controller allows the requesting host adapter to transfer data via bi-directional DATA ports such as those used in the MPAS TM multiprocessor architecture interface from Chips and Technologies, Inc. When data transfer is to system memory, the DMA controller accepts data via the DDATA port, then through the DMA channel data buffers 218, and out the MPIDATA port. The DMA channel data buffers 218 serve to assemble/disassemble data to different bus widths and to allow for acceptable bus latencies when processing parallel I/O transactions.

During data transfers a segmented counter 220 in an address generator 222 counts the number of bytes transferred and for each 16 bytes transferred within a specified address boundary an address is generated by the DMA controller to read/write 16 bytes of data.

Figure 1:
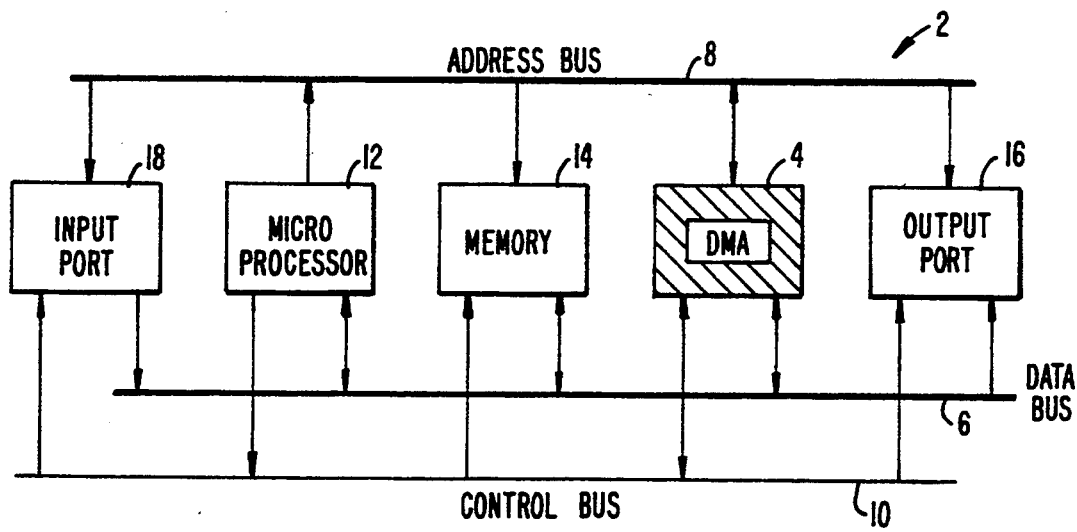
FIG. 1, described above, is an overall block diagram of a typical prior art DMA controller in a computer system.
Figure 3:
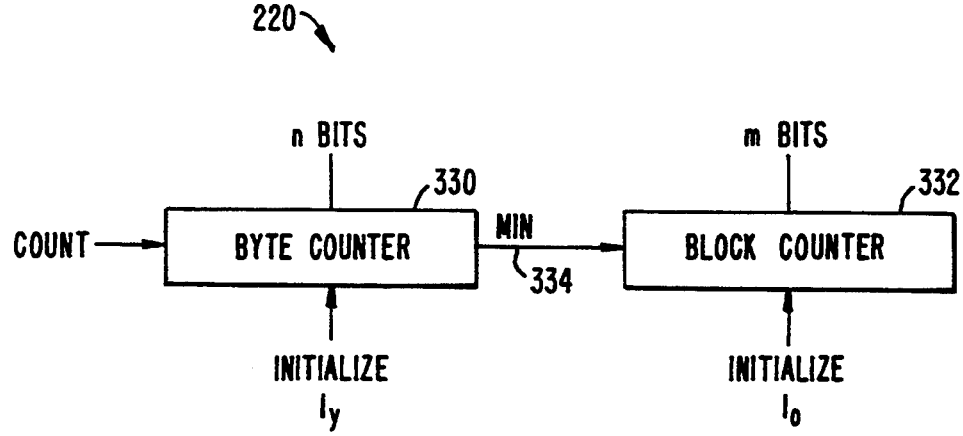
FIG. 3 is a block diagram of the counter for a DMA controller according to one embodiment of the invention.

FIG. 3 illustrates the counter in the DMA controller 220 according to one embodiment of the invention. The counter includes a first, byte stage 330 and a second, block stage 332. According to one specific of the embodiment, the byte counter is an n-bit byte counter and the second counter is an m-bit block counter. For example, in the specific embodiment of a 32-bit counter, both the byte counter and the block counter are 16-bit counters.

The byte counter and the block counter are connected by a connection 334 (labeled "MIN") which is used by the byte counter to signal the block counter each time a preselected number of bytes has passed. The byte counter is initialized with the preselected number of bits, $I_y$, which will typically be the number of bytes of data found in a typical sequence of data on the input/output device serviced by the DMA controller. For example, in the case of a disk drive the value of $I_y$ will typically be about 512 decimal, while in a video display the value of $I_y$ will be about 640 decimal to 1200 decimal in some applications. In general, this value will be selected to be equal to the number of bytes of data that will be found within a natural division of data in the device which is being serviced such as a sector on a disk drive, or the like. The block counter is initialized by the system to limit the total amount of data transferred. This value will vary widely depending upon the particular data transfer which is being conducted.

In operation, each time a byte of data is transferred, the byte counter is decremented (i.e., the value is decreased) by one. Each time the byte counter reaches the value of zero, the MIN signal becomes active, which decrements the value in the block counter by one. When both counters reach zero, the data transfer is complete, and the system returns the DMA to a wait state.

Through the use of the segmented counter disclosed herein, the speed of data transfers is expected to increase substantially, particularly when the data are divided into small groups such as sectors in a disk drive, between which the device under service will have long delay times. Exemplary of such devices are disk drives, video displays, ethernet network contorllers, and the like.

Figure 4:
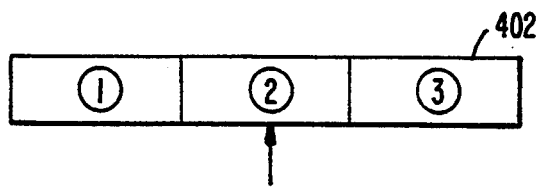
FIG. 4 illustrates the efficacy of the invention.

FIG. 4 illustrates the efficacy of the invention in the specific context of a data string 402 which is broken up into three blocks. The data string may also include header information (not shown) for control, identification and the like. In this example, the first block is separated either physically (such as on separate tracks on a disk drive) or in time (such as in an Ethernet network). A disconnect or similar failure or interruption occurs at the point labelled by an arrow. In prior systems with only a single counter it would be necessary to perform a seek operation in the case of a disk drive to relocate the disk at the beginning of the first block of data and re-read all of the data. With the segmented counter disclosed herein, it is possible to reset only the byte counter and, therefore, only becomes necessary to re-read only small portion of the data in the second block, avoiding in many cases the need for another seek operation.

The above description is illustrative and not restrictive. Many variations of the invention will become apparent to those of skill in the art upon review of this disclosure. Merely by way of example, while the invention is illustrated primarily with regard to incrementing/decrementing a value in a counter, the invention could also be used by way of incrementing a current address register and comparing to an end address register. Further, while the invention is illustrated primarily with regard to disk drive systems, the invention could also be applied to other DMA applications such as memory-to-memory transfers, or the DMA controller could be cascaded in accordance with well known techniques. The scope of the invention should, therefore, be determined not with reference to the above description, but instead should be determined with reference to the appended claims along with their full scope of equivalents.

What is claimed is:

1. A direct memory access (DMA) controller for a computer system, said direct memory access controller comprising:
   a) DMA processing means adapted to place a series of data bytes from a selected input device on a data bus for use by a selected output device at selected times, said DMA processing means comprising:
      means for detecting and communicating an occurrence of an interruption in said placement of said series of data bytes; and
   b) means, coupled to said DMA processing means, for limiting to a desired number the number of data bytes placed on said data bus, said limiting means comprising:
      i) a first, byte counter, adapted to count data bytes placed by said DMA processing means, said first, byte counter having signal means for communicating whenever said DMA processing means has placed a first preselected number of data bytes, said signal means resetting said first, byte counter when said interruption in said placement of said series of data byes occurs;
      ii) a second, block counter coupled to said first, byte counter, said second, block counter changing its count each time said signal means communicates said placement of said first preselected number of data bytes; and
      means, coupled to said second, block counter, for indicating to said DMA processing means to stop said placement of said series of data bytes on said data bus when said second, block counter reaches a second preselected number;
   wherein:
      said DMA processing means resets said first, byte counter and leaves unaffected said second, block counter when said interruption in said placement of said series of data bytes occurs, and
      said DMA processing means stops said placement of said series of data bytes when said limiting means indicates that said desired number of data bytes has been placed.

2. The DMA controller as recited in claim 1 wherein said selected input device is random access memory and said selected output device is a disk drive.

3. The DMA controller as recited in claim 1 wherein said selected input device is a disk drive and said selected output device is random access memory.

4. The DMA controller as recited in claim 1 wherein said selected input device is random access memory and said selected output device is a video display.

5. The DMA controller as recited in claim 4 wherein said first preselected number of data bytes is between about 640 and 1200 decimal.

6. The DMA controller of claims 1, 2, 3, 4 or 5 wherein said detection means comprises a message bus interface and a control system.

7. The DMA controller as recited in claim 2 wherein said first preselected number of data bytes is about 512 decimal.

8. The DMA controller as recited in claim 3 wherein said first preselected number of data bytes is about 512 decimal.

9. A DMA controller as recited in claims 1, 2, 3, 4, 5, 7 or 8 wherein said second, block counter increments its count each time said signal means communicates said placement of said first preselected number of data bytes.

10. A DMA controller as recited in claims 1, 2, 3, 4, 5, 7 or 8 wherein said second, block counter decrements its count each time said signal means communicates said placement of said first preselected number of data bytes.

* * * * *